US008483644B2

(12) United States Patent
Busson et al.

(10) Patent No.: US 8,483,644 B2
(45) Date of Patent: Jul. 9, 2013

(54) ELECTRONIC COMPONENT ALLOWING THE DECODING OF A RADIOFREQUENCY TRANSMISSION CHANNEL CONVEYING CODED DIGITAL INFORMATION, IN PARTICULAR FOR SATELLITE DIGITAL TELEBROADCASTING

(75) Inventors: Pierre Busson, Grenoble (FR); Bernard Louis-Gavet, Noyaret (FR); Pierre-Olivier Jouffre, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 4756 days.

(21) Appl. No.: 10/150,524

(22) Filed: May 17, 2002

(65) Prior Publication Data
US 2003/0053562 A1  Mar. 20, 2003

(30) Foreign Application Priority Data

May 18, 2001 (FR) ...................................... 01 06592

(51) Int. Cl.
   *H04B 1/10* (2006.01)
(52) U.S. Cl.
   USPC ........... 455/306; 455/307; 455/304; 455/312; 455/324; 455/179.1
(58) Field of Classification Search
   USPC ................... 455/3.2, 245.2, 247.1, 296–333, 455/179.1
   See application file for complete search history.

(56) References Cited

U.S. PATENT DOCUMENTS

| 4,894,657 | A | * | 1/1990 | Hwang et al. ................ 341/158 |
| 5,487,186 | A | * | 1/1996 | Scarpa ....................... 455/192.2 |
| 5,517,529 | A | * | 5/1996 | Stehlik ......................... 375/316 |
| 5,678,222 | A | * | 10/1997 | Hornak et al. ............. 379/93.26 |
| 5,722,062 | A | * | 2/1998 | Nakanishi et al. ......... 455/247.1 |
| 6,031,878 | A | * | 2/2000 | Tomasz et al. ............... 375/316 |
| 6,075,978 | A | * | 6/2000 | Tsumura .................... 455/234.1 |
| 6,091,931 | A | * | 7/2000 | Ben-Efraim et al. ........ 455/3.02 |
| 6,147,713 | A | * | 11/2000 | Robbins et al. ............... 348/555 |
| 6,163,685 | A | * | 12/2000 | Dilling et al. .............. 455/247.1 |
| 6,249,559 | B1 | * | 6/2001 | Jun .............................. 375/376 |
| 6,366,622 | B1 | * | 4/2002 | Brown et al. ................ 375/322 |
| 6,385,262 | B1 | * | 5/2002 | Gustafsson et al. .......... 375/350 |
| 6,714,776 | B1 | * | 3/2004 | Birleson ...................... 455/302 |
| 6,775,530 | B2 | * | 8/2004 | Severson et al. ............. 455/324 |
| 7,024,169 | B2 | * | 4/2006 | Ciccarelli et al. .......... 455/232.1 |

(Continued)

FOREIGN PATENT DOCUMENTS

WO    WO00/36757    6/2000

OTHER PUBLICATIONS

C. Muschallik: "System Considerations on SCPC for Digital Satelite Receivers with Direct Conversion" published by IEEE Transactions on Consumer Electronics, vol. 45, No. 3, Aug. 1999; pp. 956-964.

(Continued)

*Primary Examiner* — Edward Urban
*Assistant Examiner* — Rui Hu
(74) *Attorney, Agent, or Firm* — Allen, Dyer, Doppelt, Milbrath & Gilchrist, P.A.

(57) ABSTRACT

The component, fully integrated onto a monolithic substrate, includes a tuner, a demodulator, and a channel decoder. The overall filtering is carried out in two parts, a baseband analog filtering and a digital Nyquist filtering removing the information of adjacent channels. It outputs a stream of MPEG data.

18 Claims, 6 Drawing Sheets

U.S. PATENT DOCUMENTS

| | | | |
|---|---|---|---|
| 7,167,694 B2 * | 1/2007 | Khoini-Poorfard et al. | 455/132 |
| 7,457,617 B2 * | 11/2008 | Adams et al. | 455/418 |
| 2002/0127982 A1 * | 9/2002 | Haapoja et al. | 455/130 |
| 2002/0154620 A1 * | 10/2002 | Azenkot et al. | 370/347 |
| 2002/0181614 A1 * | 12/2002 | Mostafa et al. | 375/316 |
| 2003/0087622 A1 * | 5/2003 | Jayaraman et al. | 455/307 |
| 2011/0151814 A1 * | 6/2011 | Takeuchi | 455/213 |

OTHER PUBLICATIONS

Schwendt et al., "New Approach to Develp a System Solution for an Integrated Multi-Service System", ICCE International Conference on Consumer Electronics, Los Angeles, CA, Jun. 22-24, 1999, pp. 352-353.

* cited by examiner

ELECTRONIC COMPONENT ALLOWING THE DECODING OF A RADIOFREQUENCY TRANSMISSION CHANNEL CONVEYING CODED DIGITAL INFORMATION, IN PARTICULAR FOR SATELLITE DIGITAL TELEBROADCASTING

FIELD OF THE INVENTION

The present invention relates to electronic circuits, and, more particularly, to electronic circuits for decoding coded information.

BACKGROUND OF THE INVENTION

Audio, video and other signal information can be conveyed over a radiofrequency transmission channel as coded digital signals. Satellite digital telebroadcasting such as that defined in the Digital Video Broadcasting-Satellite (DVB-S) European specification based on MPEG compression standards, for example, is used to convey signal information in the form of digital video signals using quadrature digital modulation. The television signals originate from the satellite and are amplified and converted into a predetermined frequency band (typically 950-2150 MHz) by a parabolic dish and a low-noise converter that is located at the focus of the parabolic dish.

The signal is conveyed to the input of a tuner of a receiver. The purpose of the tuner is to select the desired channel and to output a baseband signal on an in-phase path (I path) and on a quadrature path (Q path). The signal is then converted into a digital signal and demodulated. Decoding includes distinguishing the zeros from the ones and performing error correction, typically utilizing Viterbi decoding, deinterlacing, Reed-Solomon decoding, and deshuffling. A decoding device typically outputs packets that are decoded in a conventional manner in accordance with the MPEG standards so as to redeliver as output the initial audio and video signals transmitted via the satellite.

At the input of the receiver, the signal received is composed of the collection of channels which are transmitted by the satellite and are transposed into the 950-2150 MHz frequency band. The overall power received is substantially equal to the mean power on a channel increased by ten times the Napierian logarithm of the number of channels. This signal possesses a considerable variation, one on the order of 50 dBm.

At present, in receivers as a whole, the signal received at the input is normally filtered by a wide band type filter (whose passband is of the order of several hundred MHz) placed just after the low-noise input amplifier, this being to avoid the saturation of the subsequent stages of the tuner (especially the controlled-gain amplification stages as well as the mixers of the frequency transposition stage). Furthermore, with conventional devices the low-noise input amplifier and the wide band filters are not part of the chip containing the controlled-gain amplification stage as well as the frequency transposition stage. The filters, whose cutoff frequencies can be tailored by selecting the desired channel, are embodied as discrete components such as "varicap" diodes.

Such components are relatively oversized, which is incompatible with a fully integrated embodiment of the tuner. Not only is the tuner not fully integrated, but, moreover, it is made on a semiconductor substrate different from the substrate which supports the digital part for processing, namely the demodulation and the actual channel decoding. In other words, the demodulation and the channel decoding are carried out in a separate component from that integrating the tuner. Also, the tuner is generally shielded so as to prevent the noise generated by the digital part from interfering in the mixing of the signals of the analog part.

Thus, at present, a front-end device incorporated into a satellite television signal receiver, and capable of performing the tuning, demodulation and channel decoding, comprises several separate electronic components made on different chips. This arrangement poses several disadvantages among which are added cost and use of considerable surface area.

SUMMARY OF THE INVENTION

In view of the foregoing background, it is therefore an object of the present invention to provide a device for tuning, demodulating, and decoding a coded signal, the device being more cost efficient to implement and requiring less surface area than conventional devices.

This and other objectives, features, and advantages in accordance with the present invention are provided by a single-chip, front-end electronic component integrating a radiofrequency tuner, a demodulator and a channel decoder. More particularly, the invention provides an electronic component, the component comprising an integrated circuit made on a monolithic semiconductor substrate and incorporating the following:

a tuning module of the type having zero intermediate frequency, possessing an input able to receive analog signals, conveying digital information coded by a digital modulation, (for example, satellite television signals), composed of several channels extending over a predetermined frequency span, an analog block comprising a frequency transposition stage followed by an analog filtering stage for selecting a desired channel and delivering two phase quadrature baseband analog signals containing the information conveyed by the selected channel and information of so-called adjacent channels, and an analog/digital conversion stage linked to the output of the analog block, and a channel decoding digital module, linked to the output of the analog/digital conversion stage, comprising a demodulation stage, a digital filtering stage for removing the said information of adjacent channels, and an error correction stage for delivering a stream of data packets (MPEG stream, for example) corresponding to the information conveyed by the desired channel.

The integration of the component according to the invention is possible through the use of overall filtering in two steps, namely an analog prefiltering which is relatively "soft" (that is, which selects the desired channel but allows through information of so-called adjacent channels, which is generally information relating to the channel immediately adjacent to that desired) followed by a digital Nyquist filtering removing this information of adjacent channels.

Thus, according to one embodiment of the invention, the analog filtering stage possesses a top cutoff frequency around 20% higher than the frequency half-width of a channel. Furthermore, the sampling frequency of the analog/digital conversion stage is around 2.5 times higher than the top cutoff frequency of the analog filtering stage, and the cutoff frequency of the digital filtering stage is equal to the frequency half-width of a channel.

Moreover, according to one embodiment of the invention, the sampling frequency of the analog/digital conversion stage can be adjusted as a function of the central frequency Fd of the selected channel in such a way as to repel the harmonics of the sampling frequency out of the frequency span [Fd−F2; Fd+F2], where F2 designates the top cutoff frequency of the analog filtering stage.

According to one embodiment of the invention, a metal plate is adhered by a conducted adhesive between the plate and the rear face of the substrate, this metal plate being intended to be grounded. Thus, the capacitance, of relatively high value, produced between the semiconductor substrate and the metal plate makes it possible to absorb the high-frequency current spikes.

Moreover, it is also especially advantageous for the elements performing a digital processing to be disposed in a part of the substrate which is insulated from the remaining part of the substrate by a semiconducting barrier having a type of conductivity differing from the type of conductivity of the substrate. Stated otherwise, here a so-called "triple well" technology is used. This makes it possible, when the semiconducting barrier is biased by a bias voltage different from that supplying the transistors situated in the insulated part of the substrate, to prevent noise in the supply voltage for the transistors being transmitted directly via the substrate to the baseband analog filter.

Moreover, to minimize or eliminate all sources of noise originating from the operation of the transistors (1/f noise in particular), the analog filtering stage is advantageously a bandpass filtering stage whose bottom cutoff frequency has a predetermined value greater than zero, for example, chosen of the order of 500 kHz to 1 MHz. The component then comprises controllable generation means (a frequency synthesizer, for example) able to deliver a mixing signal to the frequency transposition stage, the frequency of this mixing signal being below the central frequency of the desired channel, by an offset value chosen at least equal to the value of the bottom cutoff frequency of the analog filter.

Moreover, the demodulation stage comprises correction means able to correct the phase noise and the frequency drift of the generation means and to compensate for the bandpass filtering. Stated otherwise, the derotation algorithm according to nomenclature which is well known to the person skilled in the art, which is customarily used to correct the phase noise and the frequency drift of the generation means (frequency synthesizer), also makes it possible to compensate for the presence of the bandpass filtering.

According to one embodiment of the invention, the analog block of the tuning module comprises a first attenuator/amplifier stage with controlled gain, connected between the signal input and the frequency transposition stage. Moreover, the tuning module comprises a digital block connected to the analog block by the analog/digital conversion stage.

The tuning module may comprise:

first means of calculation able in an initialization phase to calculate the mean overall power of the entire signal received by the tuner;

first means of comparison, incorporated into the digital block, and able to compare this overall calculated power with a first predetermined reference value corresponding to a maximum power desired at a predetermined location of the analog block; and first means of adjustment able to adjust the gain of the first attenuator/amplifier stage as a function of the result of the said comparison so as to minimize the deviation between the calculated overall power and the said reference value. Also, in a normal operating phase in which a channel is selected, the gain of the first attenuator/amplifier stage is fixed.

In a general manner, it is possible to calculate the mean overall power of the entire signal received by the tuner on the basis of any signal available in the analog block of the tuner upstream of the first filter of this analog block. Thus, when the mixers of the frequency transposition stage are not equipped with filters, the first filter encountered in the analog block is the baseband filter. Hence, in this case it will be possible to use any signal taken upstream of this baseband filter. This being so, generally the mixers used in a frequency transposition stage of a tuner intrinsically comprise a filter. In this case, an analysis of the overall power of the signal received is carried out before the mixers, these elements being the last of the analog reception chain receiving all the power of various channels. This being so, it is preferable, in particular for reasons related to the design of the integrated circuit, to use the signal available between the output of the first attenuator/amplifier stage and the input of the frequency transposition stage. It would also be possible to equip the first attenuator/amplifier stage with additional filtering means so as to further attenuate the signal power, if necessary.

According to one implementation of the invention, the calculation of the mean overall power of the entire signal received is performed in the digital block of the tuner, downstream of the analog/digital conversion stage. This calculation of the mean overall power then comprises, for example, a calculation of the modulus of the sampled signal as well as a numerical integration over a certain number of samples, typically $2^{21}$. This being so, it would as a variant be possible to provide an integrator analog filter in the analog block intended to produce the mean of the analog signal from which one wishes to calculate the mean overall power. Next, the output signal from the filter (voltage), representative of the overall mean power of the signal received, would then be sampled in the analog/digital conversion stage. In theory, it would then be necessary to use just a single sample to perform the comparison with the reference value. However, in practice, this comparison would be performed with a mean value calculated over a very limited number of samples, for example three or four.

According to a preferred embodiment of the invention, the analog block of the tuner furthermore contains a second controlled-gain amplifier stage, connected downstream of the analog filtering stage. The tuning module may also comprise:

second means of calculation, connected to the output of the analog filtering stage, and able to calculate in the phase of normal operation the mean power of the selected channel;

second means of comparison, incorporated into the digital block, and able to compare this mean calculated channel power with a second predetermined reference value corresponding to a maximum channel power desired at the input of the analog/digital conversion stage; and second means of adjustment able to adjust the gain of the second amplifier stage so as to minimize the deviation between the calculated channel power and the said second reference value.

Stated otherwise, after the initialization phase, the signal is switched to the mixers of the frequency transposition stage, and the second amplification stage with controlled gain, integrated into the baseband filter, allows fine adjustment of the level at the input of the converter so as to have a power corresponding to the maximum dynamic range of the analog/digital conversion stage.

By calculating, according to the invention, in an initialization phase the overall power of the signal received and by adjusting the gain of the first attenuator/amplifier stage with controlled gain, then by tailoring the gain of the second amplifier stage in the normal operating phase, better balancing is made possible between the control of the gains of the two controlled-gain amplifier stages.

With respect to the prior art, external filters of broadband type are provided having discrete components, controllable as a function of the selecting of the desired channel, but there is no initialization phase in which the overall power of the entire signal received is calculated. The power of the signal is in fact calculated at the output of the analog block, after analog/digital conversion, on a filtered signal comprising, as well as the selected channel, the immediately adjacent channels. Also, it is on the basis of this power calculation alone that the gains of the various controlled-gain amplification stages are adjusted. Now, the drawback of this approach resides in that one then possesses just a single source of information relating to the reception power on the tuner and that this information is situated at the output of the analog chain. Also, this information is already filtered and therefore possesses only a part of the input signal, namely the desired channel and possibly the adjacent channels. The accuracy of adjustment of the various controlled-gain amplifiers is therefore less accurate than that used in the present invention which uses two different calculations of power, in the initialization phase and in the normal operating phase, so as to adjust the gains of the two controlled-gain amplification stages independently.

Furthermore, if it is now assumed that a parasitic reception spike lies in the neighborhood of the selected channel, the latter will greatly influence the calculation of the power performed at the end of the analog chain in the prior art. Consequently, the gain of the first amplifier stage will tend to be minimized so as to avoid saturation of the following elements, and this will lead to an increase in the gain of the second amplifier stage so as to obtain the maximum dynamic range at the input of the analog/digital conversion stage.

On the other hand, according to the invention, the power of the parasitic spike is "diluted" within the overall power of the signal received. This will lead, in the initialization phase, to the first amplifier stage being adjusted with a slightly higher gain than in the prior art. Therefore, in the normal operating phase, the channel power calculation performed at the output of the analog chain will lead to the gain of the second amplifier stage being adjusted with a lower gain than in the prior art. Hence, a greater margin is obtained with regard to the adjusting of the gain of the second amplifier, together with better balancing in the control of gains.

The subject of the invention is also a satellite digital television signal receiver, comprising at least one electronic component as defined hereinabove.

BRIEF DESCRIPTION OF THE DRAWINGS

Other advantages and characteristics of the invention will be apparent on examining the detailed description of wholly nonlimiting embodiments and the appended drawings, in which.

DETAILED DESCRIPTION OF THE PREFERRED EMBODIMENTS

Figure 1:
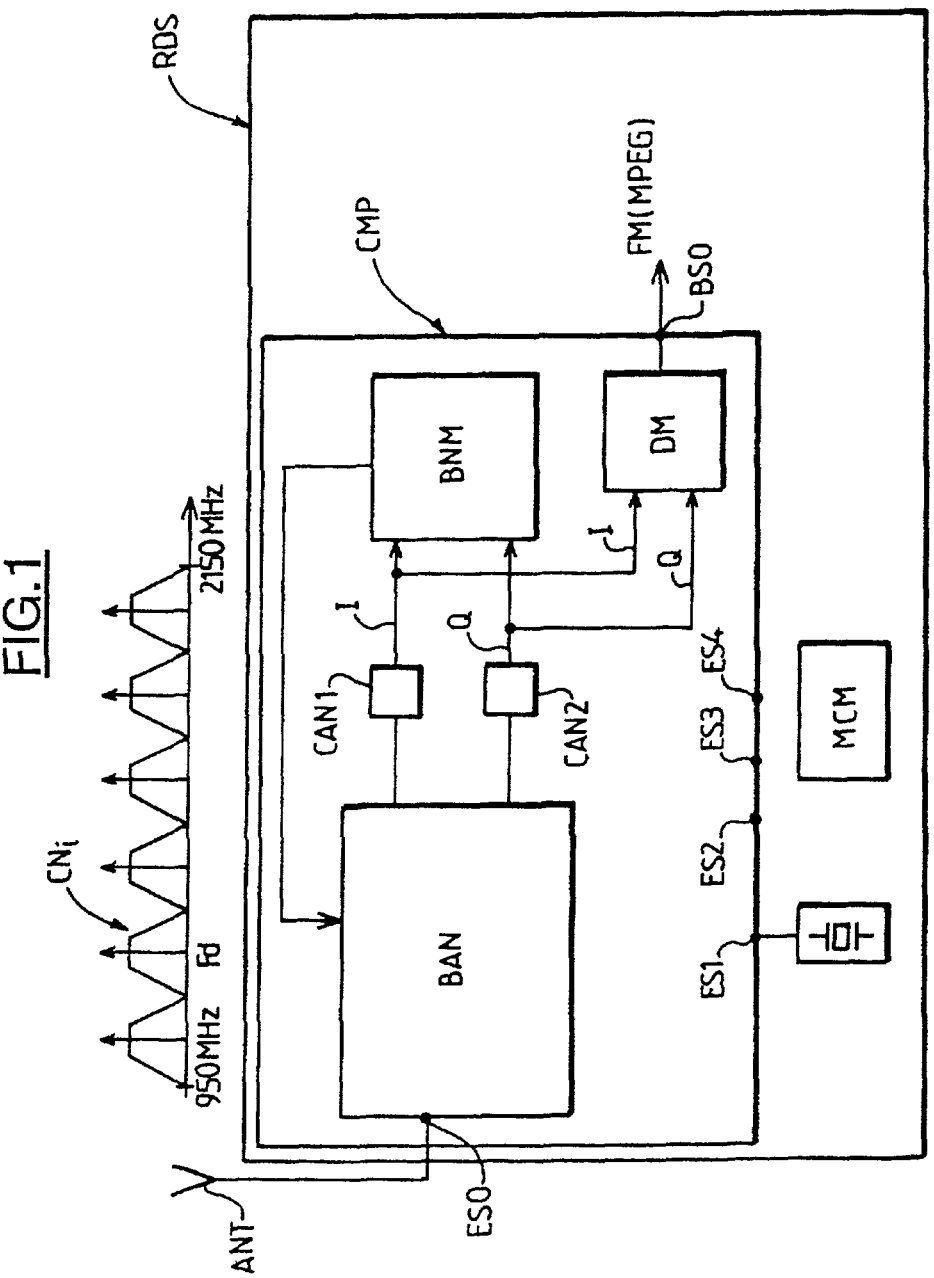
FIG. 1 is a schematic diagram of the internal structure of an electronic component according to the invention.

In FIG. 1, the reference RDS denotes a satellite receiver/decoder ("Set-top box") connected to a parabolic antenna ANT picking up digital television signals, and intended to receive and to decode these signals. This receiver RDS comprises at the front end an electronic component CMP intended to receive all the channels $CN_i$ present in the signal received at the signal input ES0 of this component, and to deliver at the output BS0 a stream FM of MPEG data. This component CMP is made entirely in an integrated manner in CMOS technology on a monolithic silicon substrate. The integrated circuit can be encapsulated in a conventional manner in a package so as to be bonded, for example by welding, to an electronic card.

The component CMP comprises at the front end a tuning device or "tuner" TZ, intended for selecting the desired channel from among all the channels $CN_i$ present in the signal received at the signal input ES0 which is also the input of the tuner. This tuner, which comprises, as will be seen in greater detail hereinbelow, an analog block BAN and a digital block BNM, is of the type having zero intermediate frequency. The analog block BAN and the digital block BNM of the tuner are separated by an analog/digital conversion stage CAN1, CAN2.

Moreover, the component CMP comprises a channel decoding digital module DM, linked to the output of the analog/digital conversion stage which delivers the stream of data packets FM, corresponding to the information conveyed by the desired channel, that is the channel selected by the tuner.

Figure 2:
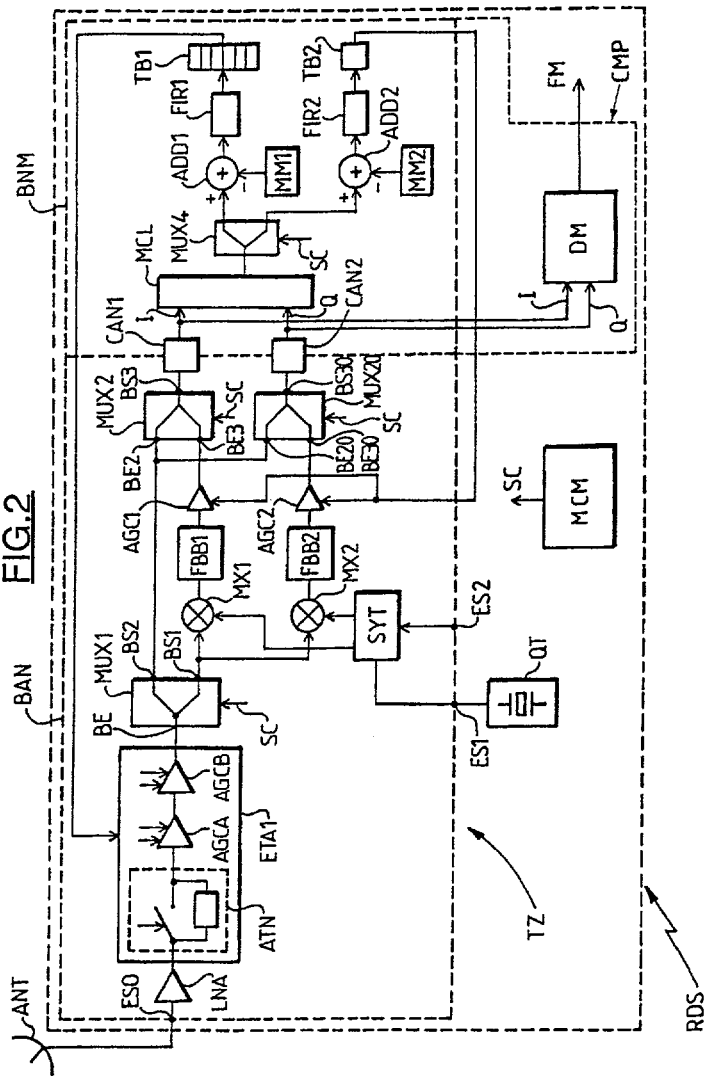
FIG. 2 is a more detailed schematic diagram of the internal architecture of the frequency tuning module of the electronic component of FIG. 1.

If reference is now made more particularly to FIG. 2, it may be seen that the tuner TZ is, as already mentioned, of the type with zero intermediate frequency, that is it does not perform any transposition of frequency to an intermediate frequency but includes just a single frequency transposition stage, here comprising the mixers MX1 and MX2, and directly transposing the signal in the vicinity of the baseband of a channel. Stated otherwise, the frequency transposition stage directly delivers the selected channel as well as the immediately adjacent channels.

The tuner TZ comprises, at the head end, a low-noise amplifier LNA connected to the signal input ES0 and having, for example, a gain of 15 dB. The amplifier LNA is followed by a first attenuator/controlled-gain amplifier stage ETA1. More precisely, this stage ETA1 comprises a controllable attenuator block ATN, which has been represented schematically in FIG. 2 by a breaker which does or does not shunt the attenuator proper. This attenuator allows, when it is actuated, a signal attenuation of −20 dB for example.

The stage ETA1 also comprises, following this attenuator block ATN, two controlled-gain amplifiers AGCA and AGCB. The gain of each amplifier AGCA or AGCB can be adjusted, for example between three discrete values, namely the values 0 dB, 6 dB and 12 dB, for example. The total gain of the amplifier block composed of the two amplifiers AGCA and AGCD can therefore be controlled in such a way as to take the values 0 dB, 6 dB, 12 dB, 18 dB or 24 dB.

The output of the stage ETA1 is connected to the input terminal BE of a signal routing means formed here of a multiplexer MUX1 controlled by a control signal SC. This multiplexer MUX1 comprises a first output terminal BS1 linked to the two mixers MX1 and MX2 of the frequency transposition stage.

These two mixers MX1 and MX2 moreover receive, in a conventional manner, two quadrature mixing signals emanating for example from a frequency synthesizer SYT. The frequency of each of the two mixing signals is identical and corresponds substantially to the frequency of the selected channel. The frequency synthesizer SYT is controlled by a selection signal emanating from a selection input ES2 connected to an I$^2$C bus according to a terminology known to the person skilled in the art. Furthermore, the frequency synthesizer is driven by a reference clock signal received on an input ES1 and originating from a quartz QT.

The two processing paths, connected to the outputs of the two mixers MX1 and MX2, are quadrature paths, named I and Q respectively according to a standard terminology known to the person skilled in the art. The I path represents the in-phase signal, while the Q path represents the quadrature signal.

As illustrated in FIG. 1, the signal received at the level of the input ES0 is formed of several channels CN$_i$ situated in the 950-2150 MHz frequency band. The central frequencies Fd of these channels are spaced apart by 45 MHz.

The mixers MX1 and MX2 are equipped at the output with low-pass filters, the cutoff frequency of which is of the order of 150 to 250 MHz. The output signal from the two mixers MX1 and MX2 is therefore a signal centered about the frequency 0 MHz, extending over a frequency band of 150 to 250 MHz and comprising the selected channel as well as the immediately adjacent channels.

Figure 3:
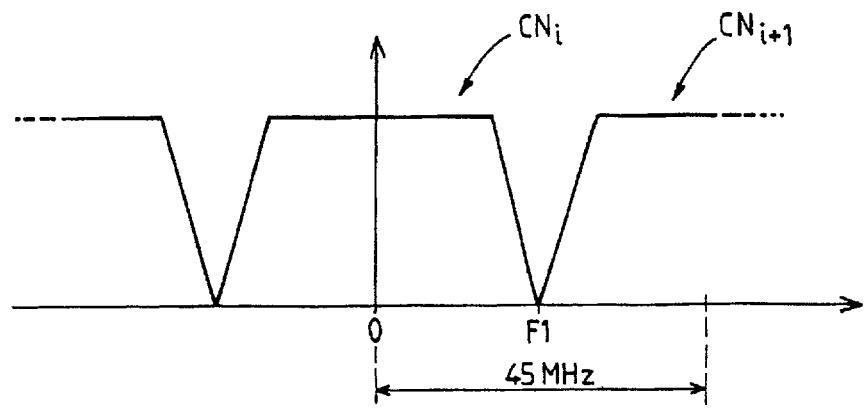
FIGS. 3, 4 and 4a are graphs plotting the frequency of channels before and after filtering.

FIG. 3 illustrates, for simplifying purposes, the selected channel CN$_i$ and the immediately adjacent channel CN$_{i+1}$. In this figure, the frequency F1, equal to 30 MHz, represents the frequency half-width of the channel CN$_i$. The person skilled in the art is aware that this frequency half-width F1 in fact corresponds to a channel's theoretic frequency half-width (for example 22.5 MHz) multiplied by a coefficient known as the "roll off", and which is, for example, equal to 1.35.

Figure 4:
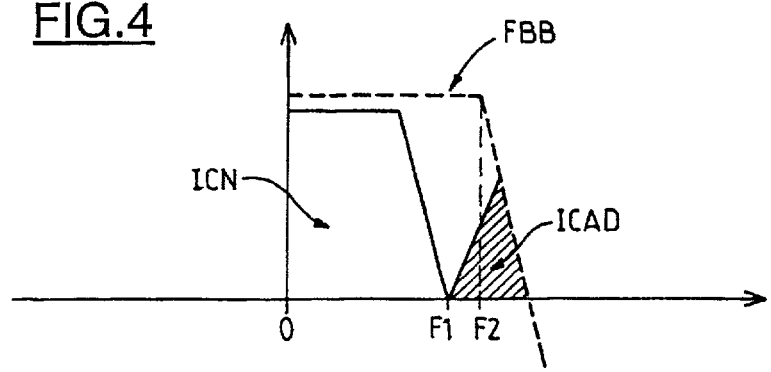

The two baseband filters FBB1 and FBB2, which follow the two mixers MX1 and MX2, have a top cutoff frequency equal to F2 (FIG. 4). According to the invention, this frequency F2 is chosen to be at least 20% higher than the frequency half-width F1 of the channel CN$_i$. By way of illustration, it will, for example, be possible to choose a top cutoff frequency F2 of each baseband filter FBB equal to 40 MHz. Thus, at the output of these two baseband filters FBB1 and FBB2 is a filtered signal comprising information ICN conveyed by the selected channel (FIG. 4) and information ICAD of so-called adjacent channels and, in practice, essentially comprising information relating to the channel immediately adjacent to that which is selected.

The person skilled in the art will consequently have noted that this analog filter, which is, for example, an order 6 filter, is a relatively soft filter, in the sense that it allows through information of adjacent channels. However, the use of a soft analog filter allows ready integration thereof on silicon. It will be seen moreover, in greater detail hereinbelow, that the overall filtering, which here includes a first analog step carried out by the FBB filtering, is in fact supplemented with a Nyquist digital filter which will remove the information of adjacent channels.

Figure 4A:
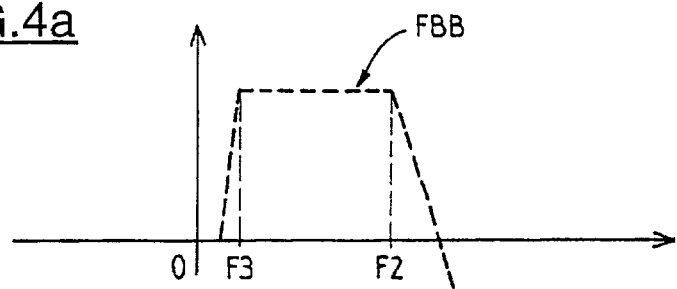

Moreover, although it is entirely possible to use a baseband filter which is a low-pass filter, as represented in FIG. 4, it is nevertheless preferable to use a bandpass filter as illustrated in FIG. 4a as baseband filter FBB. In this case, the bandpass filter FBB exhibits a bottom cutoff frequency F3 which is offset with respect to zero by a predetermined offset value, for example of the order of 500 KHz to 1 MHz. In this case, a frequency below the central frequency Fd of the desired channel will then be chosen as frequency of the mixing signals, rather than the frequency of the selected channel, as would be the case for a low-pass baseband filter. Also, more precisely, the frequency of the mixing signal would be below the central frequency by an offset value chosen at least equal to the value of the bottom cutoff frequency F3 of the analog filter FBB. The choice of frequency of the mixing signal also depends in particular on the information throughput.

The choice of a bandpass baseband filter is especially advantageous in the sense that it makes it possible to minimize or even to eliminate the source of noise originating from the operation of the transistors, which source of noise is a 1/f source. Stated otherwise, the DC component is not passed through to the analog processing.

Referring again to FIG. 2, it may be seen that the two baseband filters are followed by a second controlled-gain amplification stage formed here of two controlled-gain amplifiers AGC1 and AGC2. The outputs of the two amplifiers AGC1 and AGC2 are respectively connected to the input terminals BE3 and BE30 of two other multiplexers MUX2 and MUX20 likewise controlled by the control signal SC.

The multiplexer MUX1 also comprises a second output terminal BS2 connected directly to the other two input terminals BE2 and BE20 of the other two multiplexers MUX2 and MUX20. This direct connection path therefore shunts any means of filtering the overall signal, in this instance the filters present at the input of the mixers MX1 and MX2 as well as the baseband filters FBB1 and FBB2. This direct connection will make it possible, as will be seen in greater detail hereinbelow, to calculate the overall power of the entire signal received.

The two output terminals BS3 and BS30 of two multiplexers MUX2 and MUX20 are respectively connected to the two inputs of two analog digital converters CAN1 and CAN2 intended for sampling the analog signals received at their input at an adjustable sampling frequency. These two analog/digital converters CAN1 and CAN2 mark the boundary between the analog block BAN of the tuner BZ and the digital block BNM of this tuner. According to the invention, the sampling frequency of the analog/digital conversion stage is around 2.5 times higher than the top cutoff frequency F2 of the analog filtering stage FBB1, FBB2.

Moreover, still with the objective of minimizing the interference between the digital part of the component CMP and the analog part, it is preferable for the sampling frequency of the converters CAN1 and CAN2 to be adjustable as a function of the central frequency Fd of the selected channel in such a way as to repel the harmonics of the sampling frequency out of the frequency span [Fd−F2; Fd+F2].

In practice, the receiver RDS comprises control means MCM, for example embodied in a hard-wired manner or else within a microcontroller, which comprise a lookup table of correspondence between the central frequency of the selected channel and a sampling frequency which makes it possible to comply with the constraint regarding the top cutoff frequency F2 and the constraint regarding the frequency harmonics. This sampling frequency is for example delivered on the component input ES3, also connected to an I2C bus (FIG. 1). Moreover, the control means MCM can also make it possible to deliver in particular the control signal SC (input ES4) making it possible to switch the various multiplexers of the tuner.

Before describing the internal architecture of the digital module DM in greater detail, the internal architecture of the digital block BNM of the tuner TZ will now be described in greater detail. The two in-quadrature digital signals I and Q delivered by the analog digital converters are processed in a calculation block MCL which will determine the power of this signal (I, Q) by calculating for example the modulus thereof. A simplified way of calculating the modulus of the signal in the block MCL is provided by the formula (1) hereinbelow:

$$\text{Modulus } (I, Q) = \text{Max } (\text{abs}(I), \text{abs}(Q)) + \tfrac{1}{2} \text{Min } (\text{abs}(I), \text{abs } (Q)) \quad (1)$$

In this formula, Max denotes the maximum value, Min denotes the minimum value and abs denotes the absolute value.

As will be seen in greater detail hereinbelow, according to the phases of operation of the tuner, the input terminal of the multiplexer MUX1 can be connected either to its first output terminal BS1, or to its second output terminal BS2. Likewise, the output terminals BS3 and BS30 of the multiplexers MUX2 and MUX20 can be correspondingly linked to the output terminals BE2 and BE20 or BE3 and BE30. When a direct connection is effected between the output of the stage ETA1 and the analog digital converters CAN1 and CAN2, the two signals I and Q are in fact identical signals and not in-quadrature signals. Formula (1) hereinabove for calculating the modulus therefore simplifies and becomes formula (2) hereinbelow in which S denotes the signal delivered by the output terminal BS2 of the multiplexer MUX1.

$$\text{Modulus } (S) = \text{Max } (\text{abs } (S)) + \tfrac{1}{2} \text{Min } (\text{abs}(S)) \quad (2)$$

On the other hand, when the output of the stage ETA1 is connected to the converter CAN1 and CAN2 by way of the frequency transposition stage and of the baseband filters, the two signals I and Q are indeed two in-quadrature signals.

The output of the calculation block MCL is linked to a multiplexer MUX4, one of the outputs of which is linked to a subtracter ADD1 and the other output of which is linked to a subtracter ADD2. When one wishes to calculate the overall mean power of the entire signal received, the multiplexer MUX4 is controlled in such a way as to deliver the signal arising from the calculation block MCL to the subtracter ADD1. This subtracter ADD1 furthermore receives on its second input a first reference value, stored for example in a register or a memory MM1.

This first reference value corresponds to a maximum power desired at a predetermined location of the analog block, for example at the input of the mixers of the frequency transposition stage. It will, for example, be possible to fix this first reference value at −10 dBm, thereby making it possible to avoid saturation of the elements of the analog block.

Each sample delivered by the calculation block MCL is in fact representative of the instantaneous power of the signal received at the input of this block MCL. The subtracter ADD1 in fact compares the instantaneous power of each sample with the first reference value. These successive comparison values are then temporally integrated in an integrator with programmable coefficients FIR1.

By way of illustration, the integration is performed over a sliding window of $2^{21}$ samples and the output of the integrator therefore provides the deviation between the overall mean power of the entire signal received and the first reference value. This being so, it would also be possible to perform the integration at the output of the block MCL so as to calculate the mean power of the overall signal, then to subtract the reference value from this mean value. The subtracter would in this case be placed downstream of the integrator.

The output from the integrator FIR1 is then delivered to means for adjusting the gain of the stage ETA1. These adjusting means comprise for example a reference table which is decoded by the output of the integrator and which will deliver a digital word whose value will make it possible to control the breaker of the attenuator block ATN and to fix the gains of the two amplifiers AGCA and AGCB.

When the input of the multiplexer MUX4 is connected to its other output, that is the one linked to the subtracter ADD2, it will be possible to calculate the mean power of the selected channel and to adjust the gain of the two controlled-gain amplifiers AGC1 and AGC2. In this regard, a register or memory MM2 contains a second reference value corresponding to a maximum channel power desired at the input of the analog/digital conversion stage so as to obtain the maximum dynamic range at the input of this stage. By way of illustration, this second reference value can be taken equal to 7 dB.

The subtracter ADD2 then calculates the deviation between the instantaneous power of each sample of the selected channel and this second reference value. These deviations are then integrated in an integrator FIR2 having a structure similar to that described for the integrator FIR1. Likewise, by analogy with what was described hereinabove for the integrator FIR1, the integrator FIR2 decodes a second reference table TB2 which makes it possible to adjust the gain of the amplifiers AGC1 and AGC2.

Figure 6:
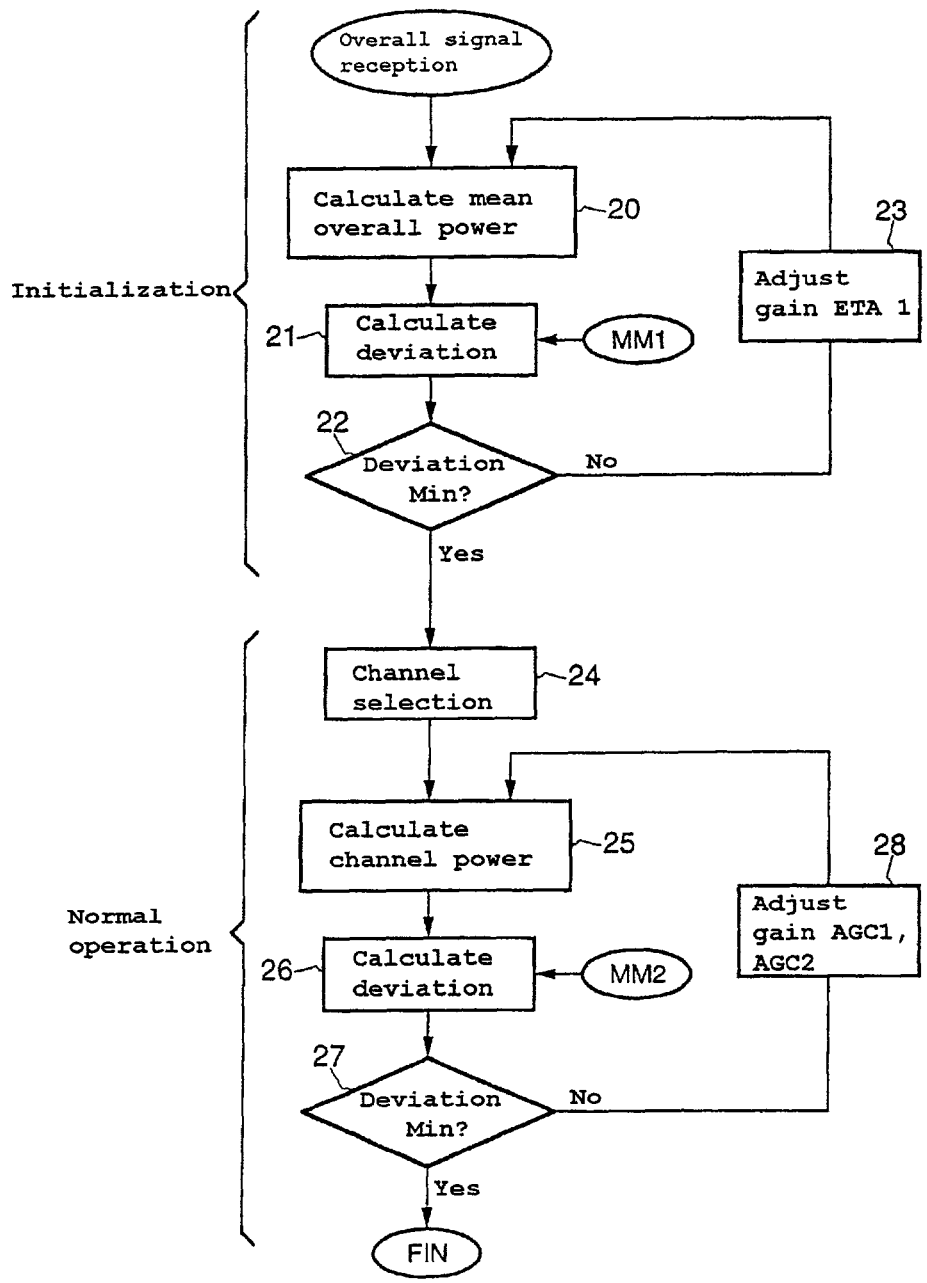
FIG. 6 is a flowchart of steps for controlling the operation of a frequency tuning module according to the invention.

The manner of operation of the tuner according to the invention will now be described in greater detail whilst referring more particularly to FIG. 6. Upon turning on the tuner, or upon a change of channel, the control means MCM position the multiplexers MUX1, MUX2 and MUX20 in such a way as to allow a direct connection between the output of the amplifying stage ETA1 and the analog/digital converters. Likewise, the multiplexer MUX4 is positioned in such a way as to link the block MCL to the adder ADD1.

A tuner initialization phase then begins. At the beginning of this initialization phase, the breaker of the attenuator block ATN is opened by default, activating the attenuator proper and the gains of the amplifiers AGCA and AGCB are by default fixed at zero. The entire signal received at the input of the signal ES0 is amplified in the amplifier LNA, then attenuated in the stage ETA1 and thereafter converted in the analog/digital converters CAN1 and CAN2.

The overall mean power of the signal is then determined as explained hereinabove and the output of the filter FIR1, representative of the deviation between this overall mean power and the reference value contained in the register MM1, decodes the table TB1, thereby bringing about the resetting of the gain of the stage ETA1 (steps 20, 21 and 23). In fact, the resetting is performed only if the deviation between this overall mean power and the reference value contained in the register MM1 can be minimized (step 22), given the gain-setting possibilities provided by the stage ETA1.

More precisely, by way of example, if it is assumed that the power of the signal received at the input ES0 is equal to −5 dBm, the power of the signal after amplification in the amplifier LNA having a gain of 15 dB is equal to +10 dBm. After passing through the attenuator ATN and through the amplifiers AGCA and AGCB initially adjusted to have zero gain, the overall mean power of the signal at the output of the stage ETA1 is equal to −10 dBm. This power will be calculated in the digital block and compared with the first reference value which is precisely equal to −10 dBm. In this case, the deviation is zero and consequently a minimum. The initialization phase then terminates and the gain and attenuation controls of the stage ETA1 are thus not modified.

If, on the other hand, the power of the signal received at the input ES0 is equal to −20 dBm, the power of the signal at the output of the stage ETA1 is equal to −25 dBm. The calculated deviation between this overall mean power and the first reference value is then equal to −15 dBm. In this case, the means for adjusting the gain of the stage ETA1 can for example adjust the gains of the two amplifiers AGCA directly in such a way as to impart a total gain of 12 dB, and this will lead to the obtaining of a signal power at the output of the stage ETA1 equal to −13 dBm. Given the possibilities of stepwise adjustment of the amplifiers AGCA and AGCB, the deviation of −3 dB between this value and the first reference value is regarded as the minimum deviation. The initialization phase is consequently terminated.

As a variant, it will have been possible to perform two successive cycles of adjustment by increasing the gain of the stage ETA1 twice running in steps of 6 dB.

At the end of the initialization phase, the tuner reverts to a phase of normal operation, in which the control means MCM deliver a control signal SC positioning the multiplexers on their other path. In the course of this phase of normal operation, the desired channel (step 24) is selected and the channel power is calculated in a similar manner to that described hereinabove in the block MCL (step 25), then compared and averaged with the aid of the subtracter ADD2, of the integrator FIR2 and of the second reference value stored in the memory MM2 (step 26). The decoding of the table TB2 allows finer adjustment of the amplifiers AGC1 and AGC2. It should be noted here that, whereas in this phase of normal operation the gain of the stage ETA1 is fixed, the gain of the amplifiers AGC1 and AGC2 is constantly readjusted (step 28) so long as the calculated deviation is not regarded as a minimum (step 27).

Figure 5:
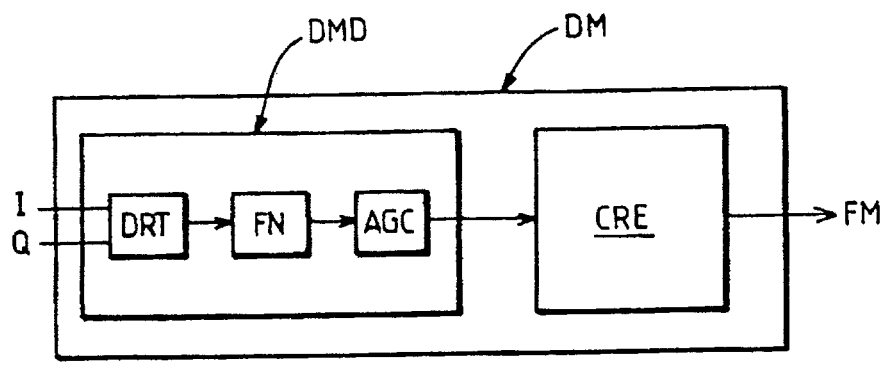
FIG. 5 illustrates is a more detailed schematic diagram of the channel decoding module of the electronic component of FIG. 1.

Now referring once again more especially to FIGS. 1, 2 and 5, it may be seen that the receiver RDS comprises a channel decoding digital module DM receiving the two signals I and Q and comprising a demodulation stage DMD capable of performing conventional demodulation processing (such as QPSK or 8PSK demodulation according to a nomenclature which is well known to the person skilled in the art), followed by an error correction stage CRE performing conventional Viterbi decoding processing, a deinterleaving, a Reed-Solomon decoding, a deshuffling, so as to deliver the packet stream FM which will be decoded in a source decoding block external to the component CMP, in accordance with the MPEG standard for example.

The demodulation and filtering stage DMD diagrammatically comprises at the front end correction means DRT ("derotator") able to correct the phase noise, the frequency drift and the frequency offset of the frequency synthesizers. The correction means DRT are also used here according to the invention to compensate for the bandpass filtering FBB1, FBB2 and thus prevent the obtaining of too low an error margin for the interpretation of the constellation. Such derotation means may for example be those described in European Patent Application No. 481,543.

The analog filtering is here supplemented with a Nyquist filtering performed in a digital filter FN, whose cutoff frequency is equal to the frequency half-width F1 of the desired channel. The filter FN consequently supplements the filtering performed by the analog filter FBB1, FBB2 and discards the information of adjacent channels.

A controlled-gain amplifier AGC makes it possible to reclamp the power level. More precisely, the mean value of the signals I and Q is measured after the digital filter and compared to a programmable value, in a manner similar to what is performed in respect of the control of the amplifiers AGC1 and AGC2. The integrated error signal is subsequently applied to a multiplier on each path I and Q.

The error correction stage CRE subsequently performs the conventional error correction processing well known to the person skilled in the art, under the nomenclature FEC (Forward Error Correction).

Figure 7:
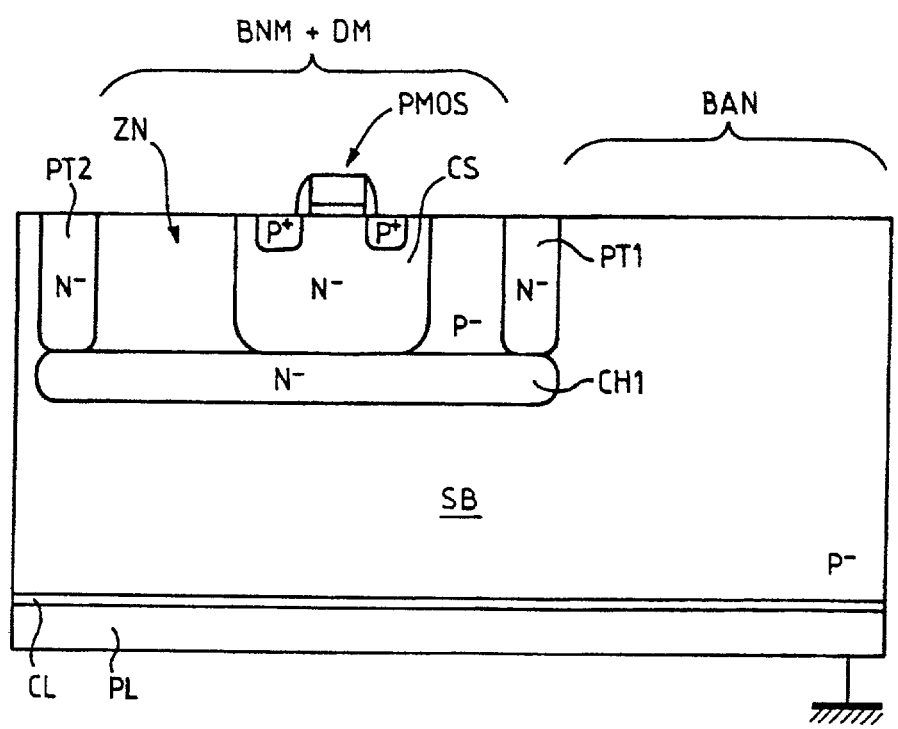
FIG. 7 is a schematic diagram of one embodiment of an electronic component according to the invention.

Technologically, the component CMP according to the invention is embodied, for example in 0.18 µm CMOS technology, on a monolithic substrate SB made of silicon, for example of P⁻ type (FIG. 7). To absorb the high-frequency current spikes, it is preferable to glue a metal plate PL onto the rear face of the substrate SB by means of a conventional conducting glue CL. This metal plate is intended to be grounded. The fine layer of oxide which forms naturally on the silicon of the substrate forms the dielectric of a capacitor whose two electrodes are formed respectively by the substrate SB and the metal plate PL. This capacitor, whose capacitance is relatively large, thus makes it possible to absorb the high-frequency current spikes.

By way of illustration, the area of the capacitor, which corresponds substantially to the area of the chip, may be of the order of 17 mm². Moreover, the digital part of the component CMP, that is in this instance the digital block BN and the module DM are made in a region ZN of the substrate which is insulated from the remainder of the substrate (in which region the analog part BAN of the component is made) by an N⁻-doped semiconducting barrier formed here of a buried layer CH1 and two wells PT1 and PT2. Moreover, the PMOS transistors of the digital part are made within an N⁻ well, which comes into contact with the buried layer CH1.

Also, to prevent the noise in the supply voltage Vdd from being transmitted via the N⁻ wells to the analog part, so that it directly disturbs the baseband filtering, it is advantageous to bias all the N⁻ wells with a different bias voltage from that supplying the transistors situated in this insulated region ZN of the substrate.

That which is claimed is:

1. An electronic component comprising:
    a monolithic substrate;
    a tuning module in said monolithic substrate, having zero intermediate frequency, and comprising
        a signal input for receiving analog signals containing digital information coded by digital modulation and comprising a plurality of channels extending over a predetermined frequency span,
        an analog block comprising a frequency transposition stage and an analog filtering stage following said frequency transposition stage, said analog block for selecting a channel from among the plurality of channels and outputting two phase quadrature baseband analog signals containing information of the selected channel and information of at least one channel adjacent the selected channel, and
        an analog/digital conversion stage connected to an output of said analog block; and
    a channel decoding digital module in said monolithic substrate and connected to said analog/digital conversion stage to receive an output thereof, said channel decoding digital module comprising
        a demodulation stage for demodulating the output of said analog/digital conversion stage,
        a digital filtering stage for removing the information of the at least one adjacent channel, and
        an error correction stage for delivering a stream of data packets corresponding to the information of the selected channel.

2. An electronic component according to claim 1 wherein said analog filtering stage has a top cutoff frequency that is about twenty percent (20%) higher than a frequency half-width of at least one of the plurality of channels; wherein said analog/digital conversion stage has a sampling frequency that is about 2.5 times higher than the top cutoff frequency of the analog filtering stage; and wherein said digital filtering stage has a cutoff frequency about equal to the frequency half-width of at least one of the plurality of channels.

3. An electronic component according to claim 2 wherein the sampling frequency of said analog/digital conversion stage varies as a function of a central frequency, Fd, of the selected channel so as to reduce harmonics of the sampling frequency from a frequency span of Fd−F2 to Fd+F2, where F2 designates the top cutoff frequency of the analog filtering stage.

4. An electronic component according to claim 1 further comprising a metal plate and an adhesive layer securing said metal plate to said monolithic substrate.

5. An electronic component according to claim 1 wherein said monolithic substrate includes an insulated portion having a first conductivity and an insulating barrier having a second conductivity, said insulating barrier insulating said insulated portion from remaining portions of said monolithic substrate; wherein at least the decoding digital module is formed in the insulated part; and wherein said insulating barrier is biased by a bias voltage different from that of said insulated portion.

6. An electrical component according to claim 1 wherein said analog filtering stage is a bandpass filtering stage having a bottom cutoff frequency, F3, with a predetermined value greater than 0; wherein said electronic component further comprises controllable generation means to deliver a mixing signal to said frequency transposition stage, the frequency of the mixing signal being below the central frequency, Fd, of the selected channel by an offset value chosen to be at least equal to the value of the bottom cutoff frequency of the analog filter; and wherein said demodulation stage comprises correction means to correct phase noise, frequency drift and the offset of said generation means and to compensate for bandpass filtering.

7. An electronic component according to claim 1 wherein said analog block of said tuning module comprises a first controlled-gain amplifier stage with controlled gain connected between said signal input and said frequency transposition stage; and wherein said tuning module further comprises a digital block connected to said analog block by said analog/digital conversion stage.

8. An electronic component according to claim 7 wherein said digital block of said tuning module comprises:
first means of calculation to calculate an overall power value based on an overall power of a signal received by said tuning module; and
first means of comparison responsive to said first means of calculation to compare the overall power value with a first predetermined reference value corresponding to a maximum power desired at a predetermined location of said analog block;
first means of adjustment to adjust a gain of the first controlled-gain amplifier stage as a function of the result of the comparison so as to reduce a deviation between the overall power value and the first predetermined reference value.

9. An electronic component according to claim 8 wherein said analog block of said tuning module comprises a second controlled-gain amplifier stage connected downstream of the analog filtering stage; and wherein said tuning module further comprises:

second means of calculation connected to said output of said analog filtering stage to calculate a power mean of the selected channel;
second means of comparison responsive to said second means of calculation to compare the power mean with a second predetermined reference value corresponding to a maximum channel power desired at the input of the analog/digital conversion stage; and
second means of adjustment to adjust a gain of said second controlled-gain amplifier stage so as to reduce a deviation between the power mean of the selected channel and the said second reference value.

10. An electronic component according to claim 8 wherein said analog filtering stage comprises at least one input; wherein said analog/digital conversion stage comprises at least one input; and wherein said tuning module further comprises means of controllable signal routing, said means of controllable signal routing comprising:
an input terminal connected to said signal input;
a first output terminal connected to said at least one input of said analog filtering stage; and
a second output terminal connected to said at least one input of the analog/digital conversion stage.

11. An electronic component according to claim 10 wherein said first controlled-gain amplifier stage comprises an input; wherein said frequency transposition comprises an output; and wherein said means of controllable signal routing are disposed between said output of said first controlled-gain amplifier stage and said input of said frequency transposition stage.

12. An electronic component according to claim 8 wherein said digital block incorporates said first means of calculation.

13. A method of processing coded digital information conveyed by radiofrequency transmission, the method comprising:
selecting one of a plurality of channels, the channel defining a selected channel, along with at least one of channel adjacent the selected channel, the plurality channels extending over a predetermined frequency span and providing analog signals containing digital information coded by digital modulation;
delivering two phase quadrature baseband analog signals in response to the selection of the selected channel, the analog signals containing digital information of the selected channel and of the at least one adjacent channel;
converting at least one of the analog signals to at least one digital signal;
demodulating the at least one digital signal;
filtering to correct phase noise, frequency drift, and a frequency offset; and
delivering a stream of data packets corresponding to the information of the selected channel.

14. A method according to claim 13 further comprising filtering at least one analog signal using a top cutoff frequency that is higher than a frequency half-width of at least one of the plurality of channels.

15. A method according to claim 14 further comprising sampling at a sampling frequency that is higher than the top cutoff frequency.

16. A method according to claim 15 wherein the sampling frequency is adjusted as a function of a central frequency of the selected channel.

17. A method according to claim 16 further comprising filtering signals with a bandpass filter whose bottom cutoff frequency has a predetermined value greater than zero.

18. A method according to claim 17 further comprising delivering a mixing signal having a frequency less than the central frequency of the selected channel.

\* \* \* \* \*